United States Patent
Wisgo

(10) Patent No.: US 11,115,371 B2
(45) Date of Patent: Sep. 7, 2021

(54) SYSTEM FOR MANAGING ELECTRONIC MAIL INCLUDING DISABLING REPLYING TO A GIVEN EMAIL AND RELATED METHODS

(71) Applicant: CITRIX SYSTEMS, INC., Ft. Lauderdale, FL (US)

(72) Inventor: Jeffrey David Wisgo, Portland, OR (US)

(73) Assignee: Citrix Systems, Inc., Ft Lauderdale, FL (US)

( * ) Notice: Subject to any disclaimer, the term of this patent is extended or adjusted under 35 U.S.C. 154(b) by 261 days.

(21) Appl. No.: 16/058,508

(22) Filed: Aug. 8, 2018

(65) Prior Publication Data

US 2020/0053043 A1 Feb. 13, 2020

(51) Int. Cl.
*H04L 12/58* (2006.01)

(52) U.S. Cl.
CPC .............. *H04L 51/34* (2013.01); *H04L 51/16* (2013.01); *H04L 51/22* (2013.01)

(58) Field of Classification Search
CPC ......... H04L 51/34; H04L 51/16; H04L 51/22; G06Q 10/107
See application file for complete search history.

(56) References Cited

U.S. PATENT DOCUMENTS

| | | | |
|---|---|---|---|
| 5,872,925 A | 2/1999 | Han | |
| 7,720,919 B2 | 5/2010 | Khouri et al. | |
| 8,583,826 B2 * | 11/2013 | Eriksson | H04L 51/28 709/245 |
| 10,275,778 B1 * | 4/2019 | Maag | G06Q 40/00 |
| 2003/0081621 A1 * | 5/2003 | Godfrey | H04L 63/20 370/400 |
| 2006/0031308 A1 * | 2/2006 | Colson | G06Q 10/107 709/206 |
| 2006/0041626 A1 | 2/2006 | Chen et al. | |
| 2006/0155705 A1 * | 7/2006 | Kamper | G06F 16/10 |
| 2008/0005355 A1 | 1/2008 | Craft et al. | |
| 2008/0189622 A1 | 8/2008 | Sanchez et al. | |

(Continued)

FOREIGN PATENT DOCUMENTS

WO WO2016144991 9/2016

*Primary Examiner* — Aaron N Strange
(74) *Attorney, Agent, or Firm* — Allen, Dyer, Doppelt + Gilchrist PA

(57) ABSTRACT

A system for managing electronic mail (email) from among email recipients may include an email management server configured to store an email reply-impermissible flag for email conversation threads and user devices each associated with a given email recipient from among the email recipients. Each user device may be configured to display a given email having a corresponding email conversation thread associated therewith and communicate an email reply status query message to the email management server for the given email. The email management server may be configured to determine if the email reply-impermissible flag is set for the corresponding email conversation thread based upon the email reply status query message for the given email, and if so, cooperate with a corresponding user device to disable replying to the given email, otherwise cooperate with the corresponding user device to permit replying to the given email.

17 Claims, 9 Drawing Sheets

(56) References Cited

U.S. PATENT DOCUMENTS

| | | | |
|---|---|---|---|
| 2008/0208988 A1* | 8/2008 | Khouri | G06Q 10/107 |
| | | | 709/206 |
| 2009/0019048 A1* | 1/2009 | Pendergast | G06F 16/93 |
| 2009/0024706 A1* | 1/2009 | Janakiraman | G06Q 10/107 |
| | | | 709/206 |
| 2009/0112998 A1* | 4/2009 | Oprescu-Surcobe | H04W 4/08 |
| | | | 709/206 |
| 2009/0125596 A1* | 5/2009 | Naick | G06Q 10/107 |
| | | | 709/206 |
| 2009/0172109 A1* | 7/2009 | Weir | H04L 51/00 |
| | | | 709/206 |
| 2009/0313554 A1 | 12/2009 | Haynes et al. | |
| 2010/0083149 A1* | 4/2010 | McCaffrey | H04L 51/22 |
| | | | 715/764 |
| 2011/0196931 A1* | 8/2011 | Clagg | H04L 51/12 |
| | | | 709/206 |
| 2012/0059886 A1* | 3/2012 | Shuster | H04L 51/28 |
| | | | 709/206 |
| 2013/0219296 A1* | 8/2013 | Thazhmon | G06Q 10/107 |
| | | | 715/752 |
| 2017/0160941 A1* | 6/2017 | Baptist | G06F 16/182 |
| 2018/0097760 A1* | 4/2018 | Roth | H04L 51/22 |
| 2018/0239932 A1* | 8/2018 | Gummeson | H04W 8/005 |
| 2019/0104100 A1* | 4/2019 | Emerson | H04L 51/32 |
| 2020/0356587 A1* | 11/2020 | Harijan | H04L 51/24 |

* cited by examiner

SYSTEM FOR MANAGING ELECTRONIC MAIL INCLUDING DISABLING REPLYING TO A GIVEN EMAIL AND RELATED METHODS

TECHNICAL FIELD

The present embodiments are directed to the field of electronics, and more particularly, to managing electronic mail and related methods.

BACKGROUND

Electronic mail (email) may be considered a relatively widely used form of communication. For example, email may be a desirable and relatively easy form of communications, both for enterprise and consumer environments.

An email client, for example, may help organize a user's email inbox. Through the use of an email client, emails may be filtered, tagged, and/or marked. Additionally, through the use of an email client, a response to an email may be sent. Emails and their respective responses or replies are typically arranged by thread or by the subject line. If multiple recipients were sent an initial email, replies may be generated and sent from each of the recipients. These replies are typically generated and communicated independently from replies from other recipients.

SUMMARY

A system for managing electronic mail (email) from among a plurality of email recipients may include an email management server configured to store an email reply-impermissible flag for each of a plurality of email conversation threads. The email reply-impermissible flag may be indicative of an already in-progress reply for a given email having a corresponding email conversation thread associated therewith. The system may also include a plurality of user devices each associated with a given email recipient from among the plurality thereof. Each user device may be configured to display a given email and communicate an email reply status query message to the email management server for the given email. The email management server may be configured to determine if the email reply-impermissible flag is set for the corresponding email conversation thread based upon the email reply status query message for the given email, and if so, cooperate with a corresponding user device to disable replying to the given email, otherwise cooperate with the corresponding user device to permit replying to the given email.

Each user device may be configured to communicate the email reply status query message based upon an input corresponding to an email reply function for the given email, for example. The email management server may be configured to, upon replying to the given email at the corresponding user device, cooperate with the corresponding user device to set the email reply-impermissible flag.

The email management server may be configured to, upon sending of a reply email to the given email from the user device, cooperate with the corresponding user device to reset the email reply-impermissible flag, for example. The email management server may be configured to cooperate with the corresponding user device to display a visual notification based upon the email reply-impermissible flag, for example. The email management server may be configured to disable replying so that the input corresponding to an email reply function for the given email at the corresponding user device is disabled, for example.

Each of the plurality of email recipients may have a priority associated therewith. The email management server may be configured to, upon obtaining a further email reply status query message for the given email from another user device and when the email reply-impermissible flag is set, determine whether the priority of the email recipient associated with the another user device is higher than that associated with the corresponding user device, and when so, cooperate with the corresponding user device to disable replying to the given email from the corresponding user device and permit replying to the given email from the another user device.

The email management server may be configured to communicate via email with the plurality of user devices, for example. The email management server may be configured to communicate with the plurality of user devices based upon a transmission control protocol (TCP), for example.

The system may also include an email server remote from the email management server and configured to communicate emails from each of the plurality of user devices, for example. The email management server may be configured to reset the reply-impermissible flag so that replying to the given email is permissible for other user devices after a threshold time of inactivity from the corresponding user device when permitted to reply to the given email. The email management server may be configured to disable replying to the given email by at least one of disabling drafting/writing, disabling sending from the corresponding user device, and blocking sending of the given email remote from the corresponding user device, for example.

A method aspect is directed to a method of managing electronic mail (email) messages from among a plurality of email recipients. The method may include using a processor cooperating with a memory configured to store an email reply-impermissible flag for each of a plurality of email conversation threads to obtain an email reply status query for a given email having a corresponding email conversation thread associated therewith from a user device associated with a given email recipient from among the plurality thereof. The method may also include using the processor to determine if the email reply-impermissible flag is set for the corresponding email conversation thread based upon the email reply status query message for the given email, and if so, cooperate with the user device to disable replying to the given email, otherwise cooperate with the user device to permit replying to the given email.

A computer readable medium aspect is directed to a non-transitory computer readable medium for managing electronic mail (email) messages from among a plurality of email recipients. The non-transitory computer readable medium includes computer executable instructions that when executed by a processor cooperating with a memory configured to store an email reply-impermissible flag for each of a plurality of email conversation threads causes the processor to perform operations. The operations may include obtaining an email reply status query for a given email having a corresponding email conversation thread associated therewith from a user device associated with a given email recipient from among the plurality thereof. The operations may also include determining if the email reply-impermissible flag is set for the corresponding email conversation thread based upon the email reply status query message for the given email, and if so, cooperate with the user device to disable replying to the given email, otherwise cooperate with the user device to permit replying to the given email.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notations are used to indicate similar elements in alternative embodiments.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
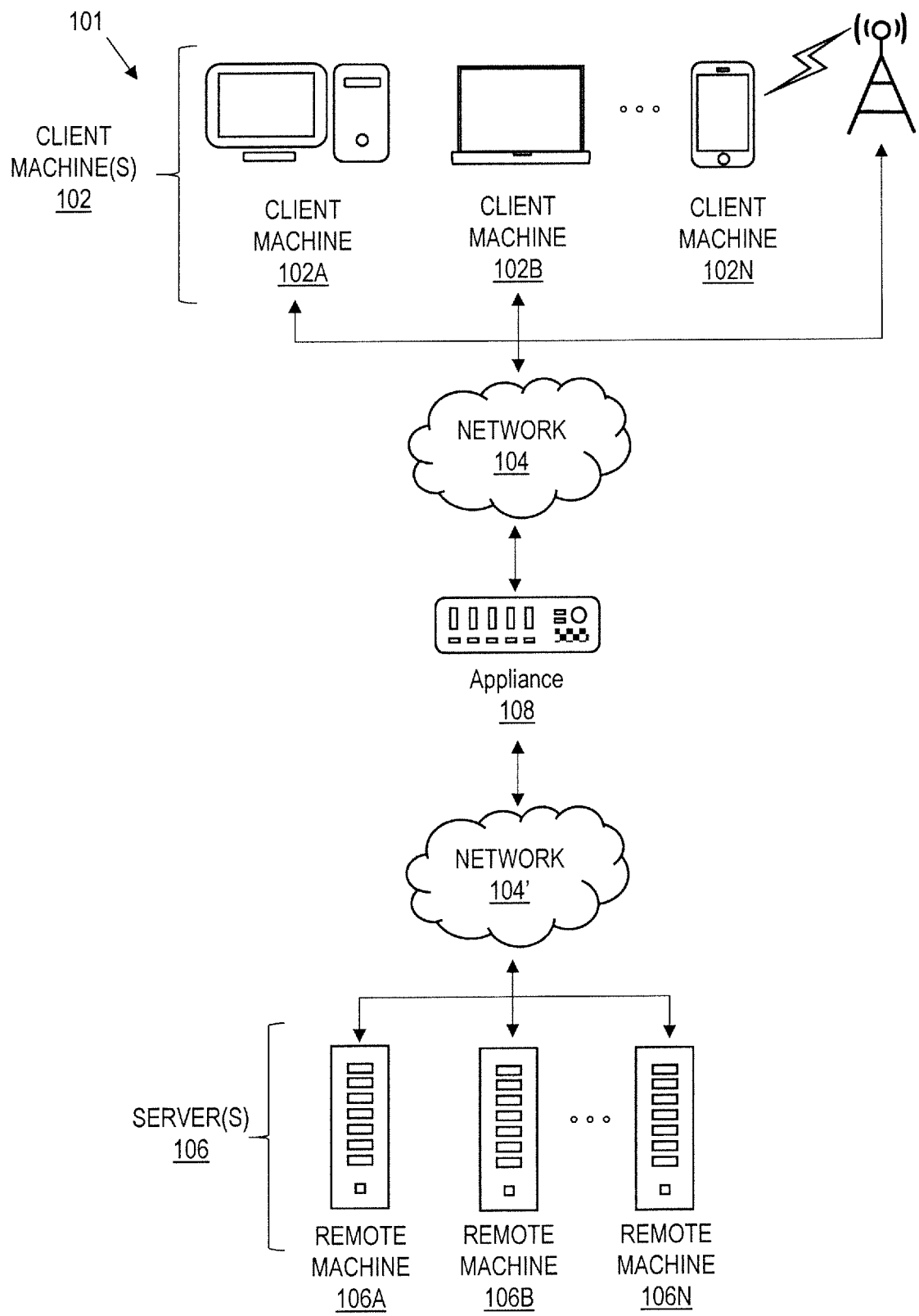
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN);

a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
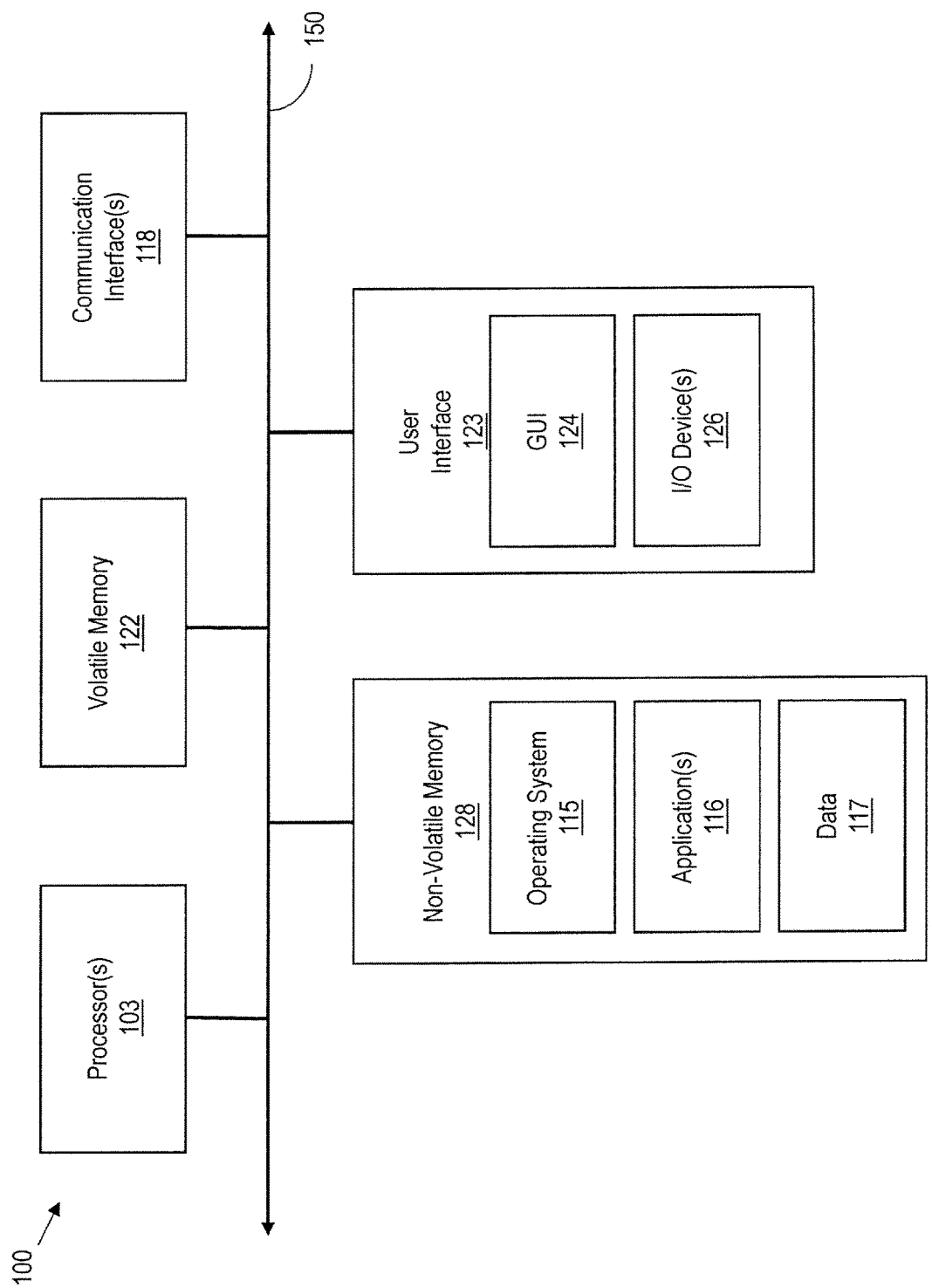
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
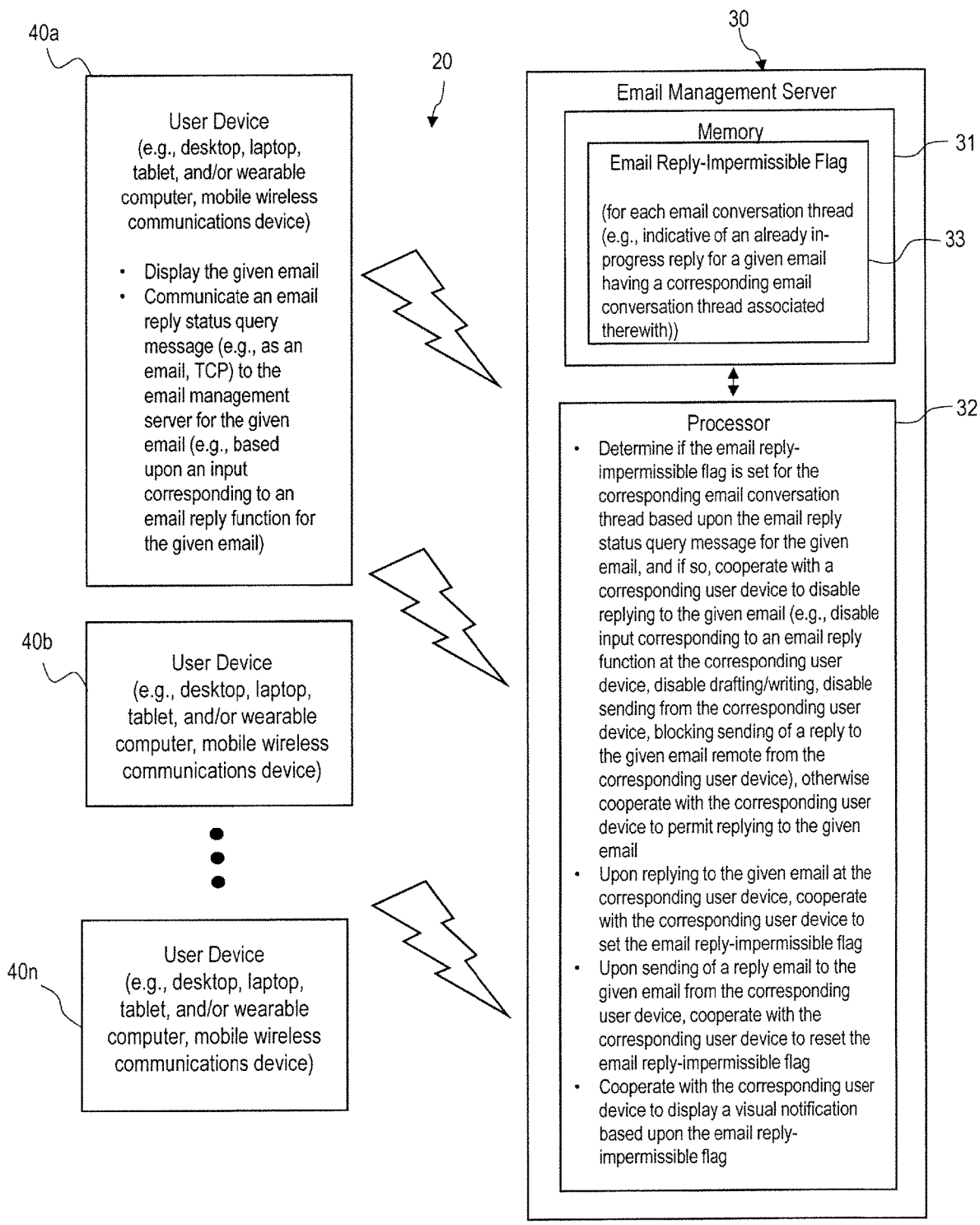
FIG. 3 is a schematic block diagram of a system for managing electronic mail messages in accordance with an embodiment.

Referring now to FIG. 3, a system for managing electronic mail (email) messages 20 from among a plurality of email recipients will now be described. The system 20 includes an email management server 30. The email management server 30 includes a memory 31 and a processor 32 coupled to the memory. Those skilled in the art will appreciate that the functions of the email management server 30 described herein are based upon cooperation of the processor 32 and the memory 31.

An email reply-impermissible flag 33 for email conversation threads 43*a*-43*n* associated with respective emails is stored in the memory 31. Emails belonging to the same email conversation thread 43*a*-43*n* may be determined based upon the subject line of the email, recipients of the email, and/or inclusion of previous emails of an email chain within the body of a given email. Of course, other techniques may be used to determine whether a given email belongs to the same email conversation thread as will be appreciate by those skilled in the art.

The email reply-impermissible flag 33 is conceptually an indicator of whether there is already an in-progress reply to the given email, and/or a reply to a given email received by a recipient will be permitted. Of course, the email reply-impermissible flag 33 may be any type of setting or indicator. Further details of the setting and resetting the email reply-impermissible flag 33 and email replies will be described in further detail below.

The system 20 also includes user devices 40*a*-40*n*. Each user device 40*a*-40*n* is associated with a given email recipient. The user devices 40*a*-40*n* may each be any of desktop computer, laptop computer, tablet computer, wearable device, and mobile wireless communications device (e.g., mobile phone or smartphone). The user devices 40*a*-40*n* may each be another type of electronic user device and may be different types of devices. Each user device 40*a*-40*n* may include an email client application executed thereon for processing emails or performing email functionality, for example, presenting or displaying emails, drafting or writing emails, sending emails (replies or original). Other functionality with respect to an email client may be included as will be appreciated by those skilled in the art.

Figure 4:
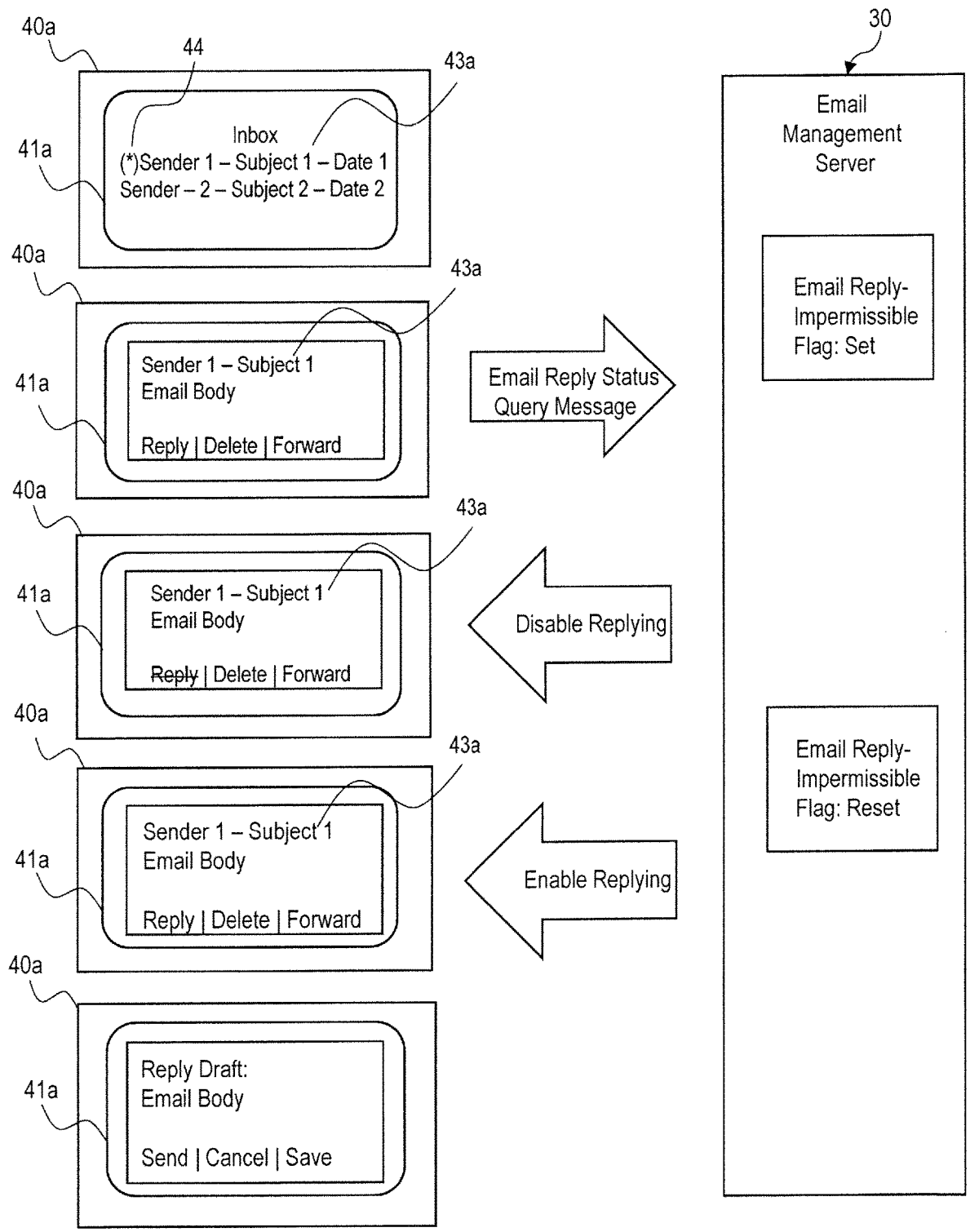
FIG. 4 is a schematic block diagram of a portion of a system for managing electronic mail messages in accordance with an embodiment.
Figure 5:
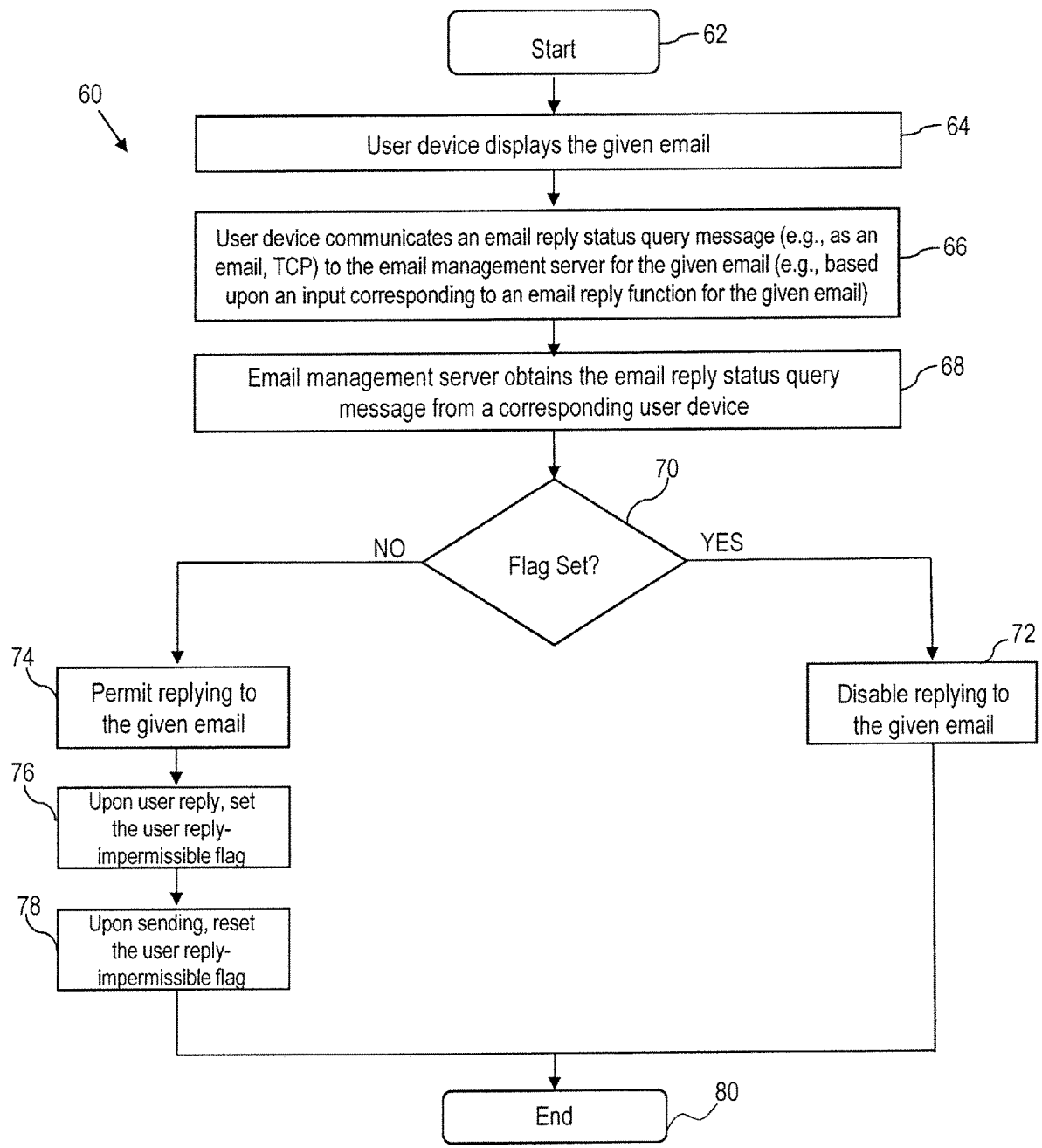
FIG. 5 is a flow diagram illustrating operation of a system for managing electronic mail messages in accordance with an embodiment.

Referring now additionally to FIG. 4, and the flowchart 60 in FIG. 5, beginning at Block 62, each user device 40a-40n is configured to display, for example, on a display 41a a given email 42a having a corresponding email conversation thread 43a associated therewith (Block 64). Each user device 40a-40n is also configured to communicate an email reply status query message to the email management server for the given email (Block 66). The email reply status query message may be communicated based upon highlighting of the given email with a cursor, upon arrival of the given email in the user's email inbox, upon input corresponding to an email reply function for the given email, and/or opening or marking as read the given email.

Each user device 40a-40n may be independently configured to communicate the email reply status query message as desired. The email reply status query message may include the corresponding email conversation thread 43a-43n as an identifier.

The email reply status query message (as well as subsequent messages described in further detail below) may be formatted or in the form of an email message and may be referred to as a "micro-email." The email reply status query message may be generated and communicated by the respective user device, and more particularly, the corresponding email client. However, unlike other emails processed through the email client, a "micro-email" is not registered by the email client, for example, so that the micro-email will not appear in a "sent" box or folder. The approach of using a "micro-email" advantageously does not use an extra protocol or infrastructure (i.e., it can be implemented relatively easily), although it may be slightly delayed depending on how the email server is configured and its load. A "micro-email" may be recognized by the email management server 30 and the user devices 40a-40n by way of embedded code, for example, metadata or hash data, as will be appreciated by those skilled in the art.

In other embodiments, the email reply status query message may be in the form of a transmission control protocol (TCP) message. The email reply status query message may be in another form or other protocol message.

At Block 68, the email management server 30 obtains the email reply status query message from a given or corresponding user device 40a-40n. The email reply status query message is communicated as described above. At Block 70, the email management server 30 determines if the email reply-impermissible flag 33 is set for the corresponding email conversation thread 43a-43n based upon the email reply status query message for the given email. The determination of whether the email reply-impermissible flag 33 is set may be made based upon a comparison of the corresponding email conversation thread 43a-43n associated with the email for which the email reply status query message was received. A match or a threshold level of matching, for example, may be used to determine the status of the corresponding email reply-impermissible flag. Other email characteristics may also be used, for example, overlap in text within the body of the email, and/or the same group of senders and recipients.

If, at Block 70, the email management server 30 determines that the email reply-impermissible flag 33 is set, meaning that a reply email to the given email is in progress (e.g., being drafted by another email recipient), the email management sever 30 cooperates with a corresponding user device 40a-40n (e.g., the user device communicating the email reply status query) to disable replying to the given email (Block 72). For example, the email management server 30 may communicate a reply disable message (e.g., in the form of a "micro-email") to the corresponding user device 40a-40n.

Disabling may include making a reply input or reply-all input in the email client inactive (e.g., grayed out or nonfunctional). Disabling may also include any of disabling drafting/writing of a reply email, disabling sending from the corresponding user device, and blocking sending of a reply to the given email remotely from the corresponding user device 40a-40n (e.g., a separate email server will not forward or process the reply email).

If, at Block 70, the email management server 30 determines that the email reply-impermissible flag 33 is not set, the email management server 30 cooperates with the corresponding user device 40a-40n to permit replying to the given email (Block 74). In other words, the email client functions normally (i.e., without restriction) with respect to email operations.

A visual status notification 44 may be generated by the email management server 30 and communicated to the corresponding user device 40a-40n. The visual status notification 44 may be indicative of whether a reply to the given email is permitted or the status (i.e., set or not set/reset) of the reply-impermissible flag 33. The visual status notification 44 may be in the form of an icon, for example, adjacent the given email. For example, a green icon may be indicative of replying to the given email being permissible while a red icon may be indicative of replying to the given email being impermissible. Of course, other types of notifications may be generated, communicated, and displayed.

At Block 76, when a user begins replying to the given email (with the email reply-impermissible flag 33 not set or reset), for example, by providing input corresponding to an email reply function or beginning to type a reply email, the email management server 30 cooperates with the user device 40a-40n to set the email reply-impermissible flag so that other users cannot reply to the same or given email. More particularly, in embodiments where the email management server 30 and user devices 40a-40n communicate via emails, such as the micro-emails described above, the corresponding user device communicates an email message to the email management server having instructions therein for setting the email reply-impermissible flag 33 so that other users cannot reply to the given email.

When the user, via the corresponding user device 40a-40n sends the reply email, for example, upon sending or by providing input corresponding to an email send function to the email client for the given email, the email management server 30 cooperates with the corresponding user device 40a-40n to reset the email reply-impermissible flag 33 so that other users can reply to the given email (Block 78). More particularly, in embodiments where the email management server 30 and user devices 40a-40n communicate via emails, such as the micro-emails described above, the corresponding user device communicates an email message to the email management server having instructions therein for resetting the email reply-impermissible flag 33. Operations end at Block 80.

Figure 6:
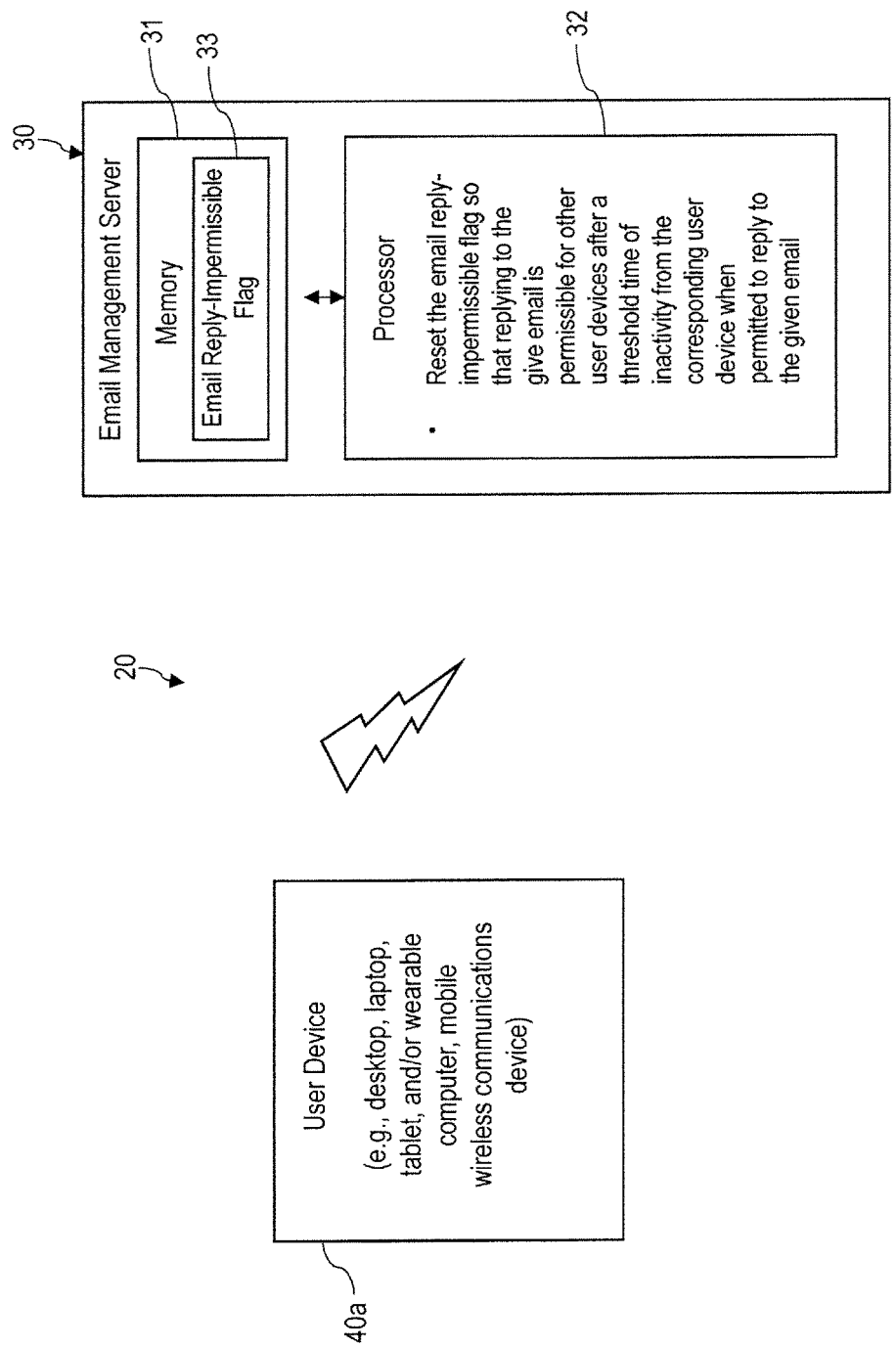
FIG. 6 is a schematic block diagram of a portion of a system for managing electronic mail messages in accordance with an embodiment.

Referring briefly to FIG. 6, if for example, in some embodiments, the user associated with the corresponding user device 40a-40n has provided input corresponding to an email reply or reply-all function in the email client (e.g., thus opening a reply dialog box), does not begin replying or does not send the reply to the given email within a threshold time of inactivity (e.g., five minutes), the email management server 30 may reset the reply-impermissible flag 33 so that replying to the given email is permissible from other user devices 40a-40n. In the case where the given user has begun drafting the reply email, but has not yet sent the reply email when the reply-impermissible flag 33 is reset for inactivity, the email management server 30 may cooperate with the given user device 40a-40n to disable further drafting and/or sending of the in-progress reply email. The email management server 30 may also generate and communicate a notification to the given user device 40a-40n for display thereon that indicates whether replying to the given email (i.e., the status of the reply-impermissible flag 33). In some embodiments, when the user aborts the reply to the given email (e.g., cancels or otherwise closes the email reply dialog within the email client), the email management server 30 may cooperate with the corresponding user device 40a-40n to reset the email reply-impermissible flag.

Figure 7:
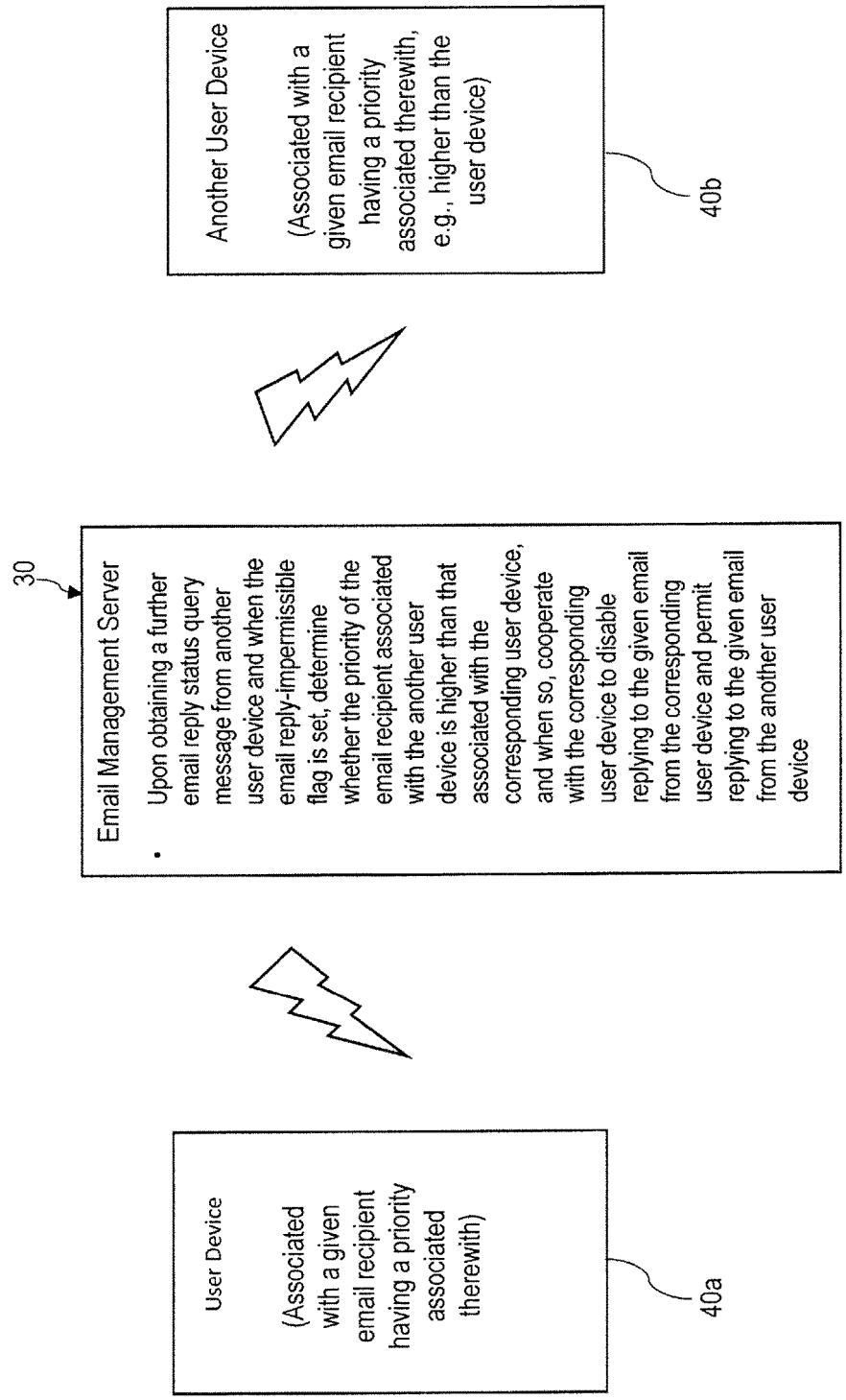
FIG. 7 is a schematic block diagram of a portion of a system for managing electronic mail messages in accordance with an embodiment.
Figure 8:
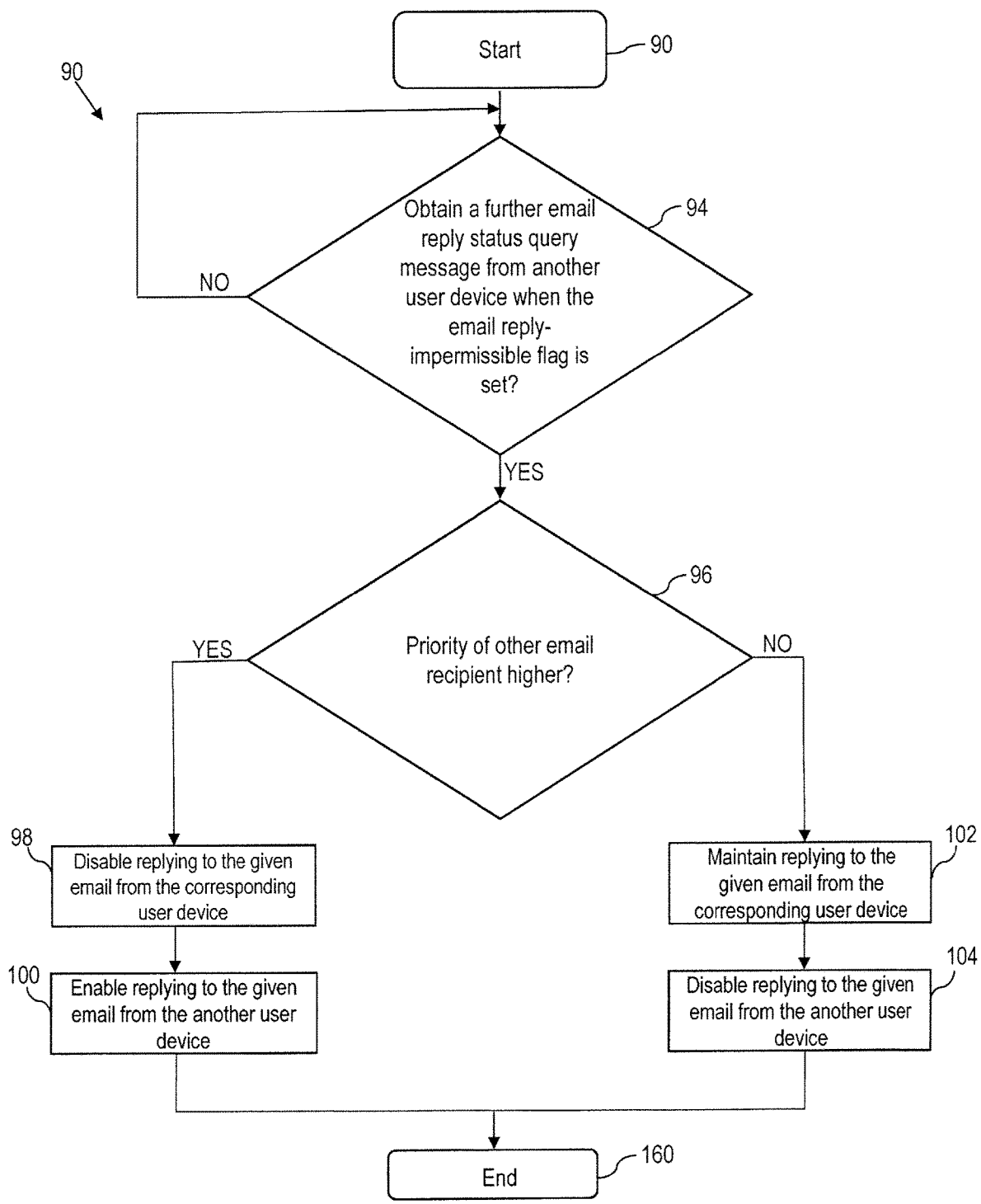
FIG. 8 is another flow diagram illustrating operation of a system for managing electronic mail messages in accordance with an embodiment.

Referring now briefly to FIG. 7 and the flowchart 90 in FIG. 8, in some embodiments, each of the email recipients has a priority associated therewith. The priority may be associated with the title or position of the email recipient or user. For example, a chief executive officer (CEO) may have higher priority than a middle manager. Of course, the priorities may be user-settable in any fashion.

Beginning at Block 92, the email management server 30, upon obtaining a further email reply status query message for the given email from another user device 40a-40n (Block 94) and when the email reply-impermissible flag 33 is set, determines whether the priority of the email recipient associated with the another user device is higher than that associated with the corresponding user device 40a-40n (Block 96). If a further email reply status query message for the given email from another user device 40a-40n is not received when the email reply-impermissible flag is set, the email management server 30 may poll for the reply status query message. If or when the priority of the email recipient associated with the another user device 40a-40n is higher than that associated with the corresponding user device, the email management server 30 cooperates with the corresponding user device to disable replying to the given email from the corresponding user device (Block 98) and permit replying to the given email from the another user device (Block 100).

If or when the priority of the email recipient associated with the another user device 40a-40n is lower than that associated with the corresponding user device, the email management server 30 cooperates with the corresponding user device to maintain replying as permitted to the given email from the corresponding user device (Block 102) and disable replying to the given email from the another user device (Block 104). The process ends at Block 106. As will be appreciated by those skilled in the art, permitting replies to the given email based upon priority may be used with any of the embodiments or steps described herein. In other words, permitting replies to the given email based upon priority may be integrated within the process described above with respect FIGS. 3-6.

Figure 9:
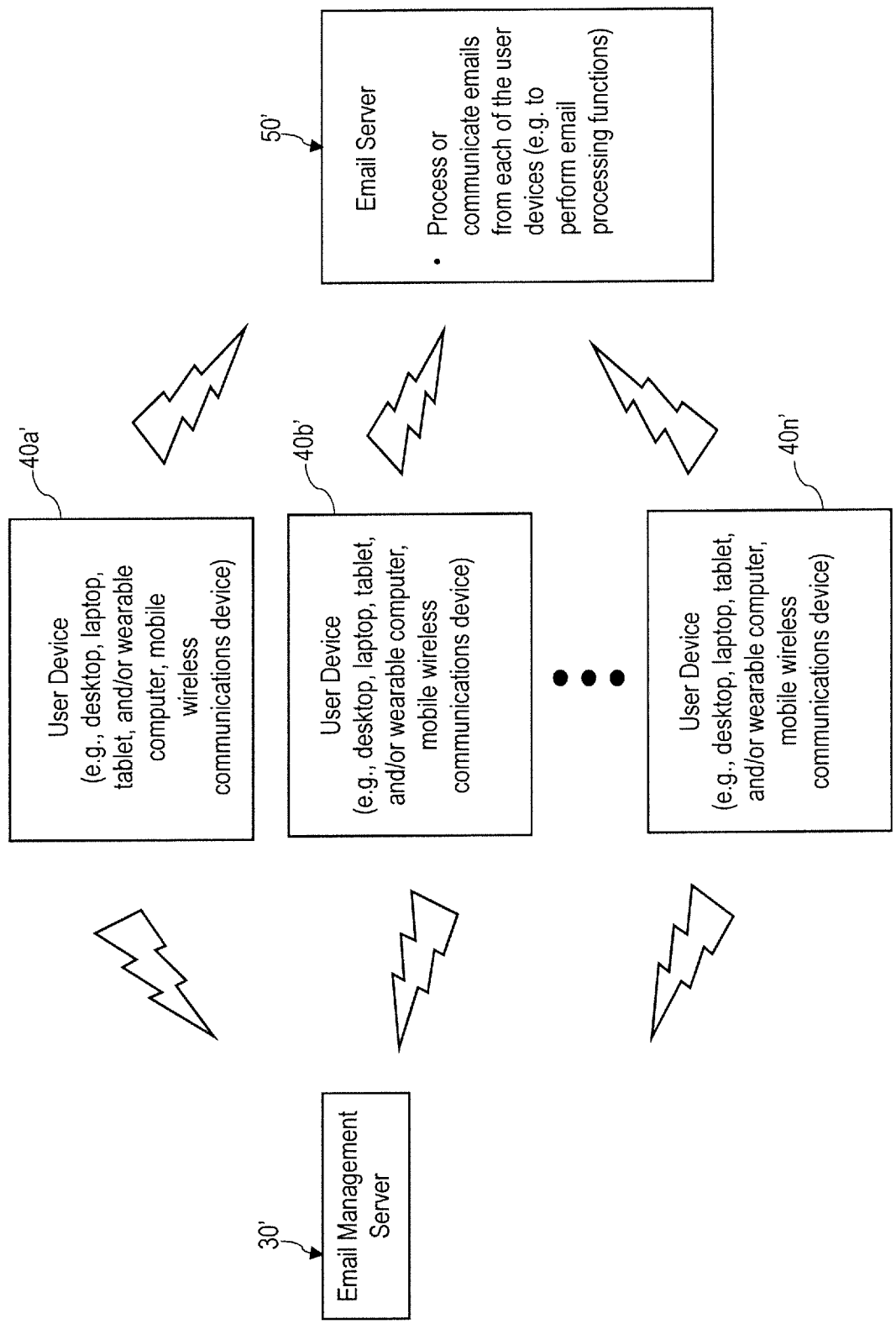
FIG. 9 is a schematic block diagram of a system for managing electronic mail messages in accordance with another embodiment.

Referring now briefly to FIG. 9, in another embodiment, the system 20' may include an email server 50' remote from the email management server 30'. The email server 50' may process emails or communicate emails from each of the plurality of user devices 40a'-40n', or perform email processing functions as will be appreciated by those skilled in the art. Accordingly, the email management server 30' may cooperate with the email server 50' and the user devices 40e-40n' to perform the functions described herein. As will be appreciated by those skilled in the art, being separate from or remote from the email server 50' (e.g., having a different Internet protocol (IP) address and/or port number), the email management server 30' may be better implemented using TCP, which may be considered more lightweight compared to the "micro-email" approach described above. Additionally, responses or communications between the email management server 30' and the user devices 40a'-40n' may be quicker than non-separate servers (e.g., an email management server that processes emails and performs the functionality described herein).

In other embodiments, the email management server 30 may cooperate with other user devices 40a-40n to display how long the given user has been typing a response or replying. Still further, in some embodiments, the email management server 30 may also be configured to join responses or replies to in-progress responses which avoids unnecessary branching of threads, for example.

The email management server 30, in another embodiment, may track separate emails that each have a different email conversation thread, but originated as a single email conversation thread (e.g., a user changed the subject line). In this case, a notification may be generated and communicated that a user via a user device 40a-40n is currently responding to a related thread to the given email.

Additionally, the email management server 30 may detect when two users are, for example, on the same team (e.g., if they have the same manager), and in that case if both of them want to write a response or reply to the given email or email conversation thread 43a-43n, each may be permitted to visually see via a display what the other is drafting or writing (e.g., in real time). In some embodiments, each user may also be permitted to edit the same given email in real time. Those skilled in the art will appreciate that the concurrent displaying and editing may be more advantageous when there are more than two email recipients on the given email.

As will be appreciated by those skilled in the art, the system 20 described herein may advantageously address problems that may arise when two or more users are responding to an email simultaneously or near simultaneously. When this occurs, a second user's reply or response that is received may be considered invalid or redundant (e.g., it does not address the latest email reply or response). Depending on notification settings, the second user typing the response (i.e., the user who began drafting or replying to the email after the first user began their response) may not realize the first user's response has been received, is being drafted, and/or was aborted. Accordingly, the system 20 may manage reply emails so that there is no overlap or invalid or redundant replies.

A method aspect is directed to a method of managing electronic mail (email) messages from among a plurality of email recipients. The method may include using a processor cooperating with a memory configured to store an email reply-impermissible flag for each of a plurality of email conversation threads 43a-43n to obtain an email reply status query for a given email having a corresponding email conversation thread associated therewith from a user device associated with a given email recipient from among the plurality thereof. The method may also include using the processor to determine if the email reply-impermissible flag is set for the corresponding email conversation thread 43a-43n based upon the email reply status query message for the given email, and if so, cooperate with the user device to disable replying to the given email, otherwise cooperate with the user device to permit replying to the given email.

A computer readable medium aspect is directed to a non-transitory computer readable medium for managing electronic mail (email) messages from among a plurality of email recipients. The non-transitory computer readable medium includes computer executable instructions that when executed by a processor 32 cooperating with a memory 31 configured to store an email reply-impermissible flag 33 for each of a plurality of email conversation threads 43a-43n causes the processor to perform operations. The operations may include obtaining an email reply status query for a given email having a corresponding email conversation thread 43a-43n associated therewith from a user device 40a-40n associated with a given email recipient from among the plurality thereof. The operations may also include determining if the email reply-impermissible flag 33 is set for the corresponding email conversation thread 43a-43n based upon the email reply status query message for the given email, and if so, cooperate with the user device 40a-40n to disable replying to the given email, otherwise cooperate with the user device to permit replying to the given email.

While several embodiments have been described herein, it will be appreciated by those skilled in the art that any embodiment or element or elements therefrom may be used with any other embodiment or element or elements therefrom. Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A system for managing electronic mail (email) from among a plurality of email recipients, each of the plurality of email recipients having a priority associated therewith, the system comprising:
an email management server configured to store an email reply-impermissible flag for each of a plurality of email conversation threads, the email reply-impermissible flag being indicative of an in-progress reply for a given email having a corresponding email conversation thread associated therewith; and
a plurality of user devices each associated with a given email recipient from among the plurality thereof, each user device configured to
display the given email, and
communicate an email reply status query message to the email management server for the given email;
the email management server configured to determine if the email reply-impermissible flag is set for the corresponding email conversation thread based upon the email reply status query message for the given email, when the email reply-impermissible flag is set for the corresponding email conversation thread,
cooperate with a corresponding user device to disable replying to the given email, and determine when the in-progress reply for the given email has been sent, and when the in-progress reply for the given email has been sent, reset the email reply-impermissible flag to permit replying to the given email,
reset the email reply-impermissible flag so that replying to the given email is permissible for other user devices after a threshold time of inactivity from the corresponding user device when permitted to reply to the given email, and
based upon receiving a further email reply status query message for the given email from another user device, determine whether the priority of the email recipient associated with the another user device is higher than that associated with the corresponding user device, and when so, cooperate with the corresponding user device to disable replying to the given email from the corresponding user device and permit replying to the given email from the another user device, otherwise maintain replying to the given email from the corresponding user device until the email reply-impermissible flag has been reset based upon one of the in-progress reply for the given email being sent and expiration of the threshold time of inactivity, and
when the email reply-impermissible flag is not set for the corresponding email conversation thread, cooperate with the corresponding user device to permit replying to the given email.

2. The system of claim 1 wherein each user device is configured to communicate the email reply status query message based upon an input corresponding to an email reply function for the given email.

3. The system of claim 1 wherein the email management server is configured to, upon replying to the given email at the corresponding user device, cooperate with the corresponding user device to set the email reply-impermissible flag.

4. The system of claim 1 wherein the email management server is configured to cooperate with the corresponding user device to display a visual notification based upon the email reply-impermissible flag.

5. The system of claim 1 wherein the email management server is configured to disable replying so that the input corresponding to an email reply function for the given email at the corresponding user device is disabled.

6. The system of claim 1 wherein the email management server is configured to communicate via email with the plurality of user devices.

7. The system of claim 1 wherein the email management server is configured to communicate with the plurality of user devices based upon a transmission control protocol (TCP).

8. The system of claim 1 further comprising an email server remote from the email management server and configured to communicate emails from each of the plurality of user devices.

9. The system of claim 1 wherein the email management server is configured to disable replying to the given email by at least one of disabling drafting/writing, disabling sending from the corresponding user device, and blocking sending of a reply to the given email remote from the corresponding user device.

10. An email management server for a system for managing electronic mail (email) from among a plurality of email recipients, each of the plurality of email recipients having a priority associated therewith, the email management server comprising:
a memory configured to store an email reply-impermissible flag for each of a plurality of email conversation threads, the email reply-impermissible flag being indicative of an in-progress reply for a given email having a corresponding email conversation thread associated therewith from a user device associated with a given email recipient from among the plurality thereof; and a processor coupled to the memory and configured to obtain an email reply status query for the given email,
determine if the email reply-impermissible flag is set for the corresponding email conversation thread based upon the email reply status query message for the given email,
when the email reply-impermissible flag is set for the corresponding email conversation thread,
cooperate with the user device to disable replying to the given email, and determine when the in-progress reply for the given email has been sent, and when the in-progress reply for the given email has been sent, reset the email reply-impermissible flag to permit replying to the given email,
reset the email reply-impermissible flag so that replying to the given email is permissible for other user devices after a threshold time of inactivity from the corresponding user device when permitted to reply to the given email, and
based upon receiving a further email reply status query message for the given email from another user device, determine whether the priority of the email recipient associated with the another user device is higher than that associated with the corresponding user device, and when so, cooperate with the corresponding user device to disable replying to the given email from the corresponding user device and permit replying to the given email from the another user device, otherwise maintain replying to the given email from the corresponding user device until the email reply-impermissible flag has been reset based upon one of the in-progress reply for the given email being sent and expiration of the threshold time of inactivity, and
when the email reply-impermissible flag is not set for the corresponding email conversation thread, cooperate with the user device to permit replying to the given email.

11. The email management server of claim 10 wherein the processor is configured to, upon replying to the given email at the corresponding user device, set the email reply-impermissible flag.

12. The email management server of claim 10 wherein the processor is configured to disable replying to the given email by at least one of disabling drafting/writing, disabling sending from the corresponding user device, and blocking sending of the given email remote from the corresponding user device.

13. A method of managing electronic mail (email) from among a plurality of email recipients each having a priority associated therewith, the method comprising:
using a processor cooperating with a memory configured to store an email reply-impermissible flag for each of a plurality of email conversation threads, the email reply-impermissible flag being indicative of an in-progress reply for a given email having a corresponding email conversation thread associated therewith from a user device associated with a given email recipient from among the plurality thereof, the processor being used to obtain an email reply status query for the given email,
determine if the email reply-impermissible flag is set for the corresponding email conversation thread based upon the email reply status query message for the given email,
when the email reply-impermissible flag is set for the corresponding email conversation thread,
cooperate with the user device to disable replying to the given email, and determine when the in-progress reply for the given email has been sent, and when the in-progress reply for the given email has been sent, reset the email reply-impermissible flag to permit replying to the given email,
reset the email reply-impermissible flag so that replying to the given email is permissible for other user devices after a threshold time of inactivity from the corresponding user device when permitted to reply to the given email, and
based upon obtaining a further email reply status query message for the given email from another user device, determine whether the priority of the email recipient associated with the another user device is higher than that associated with the corresponding user device, and when so, cooperate with the corresponding user device to disable replying to the given email from the corresponding user device and permit replying to the given email from the another user device, otherwise maintain replying to the given email from the corresponding user device until the email reply-impermissible flag has been reset based upon one of the in-progress reply for the given email being sent and expiration of the threshold time of inactivity, and
when the email reply-impermissible flag is not set for the corresponding email conversation thread, cooperate with the user device to permit replying to the given email.

14. The method of claim 13 wherein using the processor comprises using the processor to, upon replying to the given email at the corresponding user device, cooperate with the corresponding user device to set the email reply-impermissible flag.

15. The method of claim 13 wherein using the processor comprises using the processor to disable replying to the given email by at least one of disabling drafting/writing, disabling sending from the corresponding user device, and blocking sending of the given email remote from the corresponding user device.

16. A non-transitory computer readable medium for managing electronic mail (email) from among a plurality of email recipients each having a priority associated therewith, the non-transitory computer readable medium comprising computer executable instructions that when executed by a processor cooperating with a memory configured to store an email reply-impermissible flag for each of a plurality of email conversation threads, wherein the email reply-impermissible flag is indicative of an in-progress reply for a given email having a corresponding email conversation thread associated therewith from a user device associated with a given email recipient from among the plurality thereof, causes the processor to perform operations comprising:
obtaining an email reply status query for the given email having a corresponding email conversation thread associated therewith;

determining if the email reply-impermissible flag is set for the corresponding email conversation thread based upon the email reply status query message for the given email, when the email reply-impermissible flag is set for the corresponding email conversation thread, cooperating with the user device to disable replying to the given email, and determining when the in-progress reply for the given email has been sent, and when the in-progress reply for the given email has been sent, resetting the email reply-impermissible flag to permit replying to the given email, resetting the email reply-impermissible flag so that replying to the given email is permissible for other user devices after a threshold time of inactivity from the corresponding user device when permitted to reply to the given email, and based upon receiving a further email reply status query message for the given email from another user device, determining whether the priority of the email recipient associated with the another user device is higher than that associated with the corresponding user device, and when so, cooperating with the corresponding user device to disable replying to the given email from the corresponding user device and permit replying to the given email from the another user device, otherwise maintaining replying to the given email from the corresponding user device until the email reply-impermissible flag has been reset based upon one of the in-progress reply for the given email being sent and expiration of the threshold time of inactivity; and when the email reply-impermissible flag is not set for the corresponding email conversation thread, cooperating with the user device to permit replying to the given email.

17. The non-transitory computer readable medium of claim 16 wherein disabling comprises disabling replying to the given email by at least one of disabling drafting/writing, disabling sending from the corresponding user device, and blocking sending of the given email remote from the corresponding user device.

* * * * *